(12) United States Patent
Leary et al.

(10) Patent No.: US 7,839,768 B2
(45) Date of Patent: Nov. 23, 2010

(54) REDUNDANT ETHERNET PACKET NETWORK MANAGEMENT

(75) Inventors: Kevin J. Leary, Westborough, MA (US); John R. Thomas, Jr., Sherborn, MA (US); Gary R. Johnson, Millville, MA (US)

(73) Assignee: Quasar Technologies, Inc., Kennesaw, GA (US)

( * ) Notice: Subject to any disclaimer, the term of this patent is extended or adjusted under 35 U.S.C. 154(b) by 625 days.

(21) Appl. No.: 11/346,955

(22) Filed: Feb. 3, 2006

(65) Prior Publication Data

US 2006/0253613 A1    Nov. 9, 2006

Related U.S. Application Data

(60) Provisional application No. 60/650,447, filed on Feb. 4, 2005.

(51) Int. Cl.
    *H04J 1/16*    (2006.01)
(52) U.S. Cl. ...................................... 370/219
(58) Field of Classification Search ............... 370/241, 370/248, 216–228, 351, 389, 419, 420, 421, 370/395.1, 395.5; 709/250
    See application file for complete search history.

(56) References Cited

U.S. PATENT DOCUMENTS

| | | | | |
|---|---|---|---|---|
| 4,984,233 | A * | 1/1991 | Nakayashiki et al. | 370/249 |
| 5,392,286 | A * | 2/1995 | Tanaka et al. | 370/231 |
| 5,537,532 | A * | 7/1996 | Chng et al. | 714/4 |
| 5,544,163 | A | 8/1996 | Madonna | |
| 5,856,974 | A | 1/1999 | Gervais et al. | |
| 6,169,726 | B1 * | 1/2001 | Dempsey et al. | 370/219 |
| 7,003,705 | B1 * | 2/2006 | Yip et al. | 714/717 |
| 7,051,093 | B1 * | 5/2006 | Lewis et al. | 709/221 |
| 7,161,900 | B2 * | 1/2007 | Tanada | 370/225 |
| 7,418,068 | B2 * | 8/2008 | Barrett et al. | 375/355 |
| 2002/0159389 | A1 * | 10/2002 | Foster et al. | 370/230 |
| 2003/0174709 | A1 | 9/2003 | Shankar | |
| 2004/0008722 | A1 * | 1/2004 | G. Ellis et al. | 370/461 |
| 2004/0023651 | A1 | 2/2004 | Gollnick et al. | |
| 2005/0063396 | A1 * | 3/2005 | Yu | 370/401 |
| 2005/0207348 | A1 * | 9/2005 | Tsurumi et al. | 370/241 |

OTHER PUBLICATIONS

Understanding Spanning-Tree Protocol C1-C-12.
International Search Report, from PCT/US06/03994, mailed Sep. 6, 2007.

* cited by examiner

*Primary Examiner*—Kwang B Yao
*Assistant Examiner*—Obaidul Huq
(74) *Attorney, Agent, or Firm*—Nutter McClennen & Fish LLP (57) ABSTRACT

Methods and systems for configuring nodes in a redundant network configuration include identifying a master node from a plurality of nodes in the network by sending a configuration packet to each node. The configuration packet includes an identification number representing the node in the network from which the configuration packet originates, where each node in the network has a unique identification number. At each node in the network, the identification number in the configuration packet is compared to an identification number for that node. In one embodiment, the node whose identification number is greater than the identification number in the configuration packet is designated the master node. A virtual break is created in the network at the location of the master node to prevent a packet from returning to the node from which it originates.

19 Claims, 12 Drawing Sheets

REDUNDANT ETHERNET PACKET NETWORK MANAGEMENT

RELATED APPLICATIONS

This patent application claims priority to Provisional U.S. Patent Application No. 60/650,447, filed on Feb. 4, 2005 and entitled "Redundant Ethernet Packet Network Management." The priority application is hereby incorporated by reference in its entirety herein.

FIELD OF THE INVENTION

The present invention relates to redundant network configurations, and in particular, methods and systems for preventing redundant packets from returning to its point of origin.

BACKGROUND OF THE INVENTION

Packet-switched networks have become common for transferring many types of data among network nodes. In a packet-switched network, nodes share a communications channel via a virtual circuit, or non-dedicated connection through a shared medium that gives the high-level user the appearance of a dedicated, direct connection from the source node to the destination node. Messages sent over such a network are partitioned into packets, which may contain an amount of data, accompanied by addressing information. Packets are sent from a source node to a destination node one packet at a time as the network hardware delivers the packets through the virtual circuit. Internet Protocol networks operate in this manner, as do Ethernet networks.

In packet-switched networks, and in Ethernet networks in particular, there is a need for redundancy in pathways between source and destination nodes. If there is only one path between a source and destination, and there is a failure of any intermediate node or communication line, then messages cannot be delivered. Multiple active paths between nodes, however, can cause loops in the network. Loops can result in nodes seeing that same packet over and over, thereby degrading network performance. In addition, the packet forwarding algorithms, especially in an Ethernet network, can become confused by loops. For an Ethernet network to function properly, only one active path can exist between two nodes.

One system developed to address these concerns is the Spanning-Tree Protocol. Spanning-Tree Protocol is a link management protocol that provides path redundancy while preventing undesirable loops in the network. To provide path redundancy, Spanning-Tree Protocol defines a tree that spans all switches in an extended network. Spanning-Tree Protocol forces certain redundant data paths into a standby or blocked state. If one network segment in the Spanning-Tree Protocol becomes unreachable, or if Spanning-Tree Protocol costs change, the spanning-tree algorithm reconfigures the spanning-tree topology and reestablishes the link by activating a standby path.

While the Spanning-Tree Protocol provides the benefits of path redundancy and manages the problems created by path redundancy, it still leaves issues to be overcome. In general, a network operated using the Spanning-Tree Protocol must be managed and mapped out by an individual. Even when the protocol can self-configure, often the resulting network configuration is sub-optimal, and optimization can only be achieved by an individual altering the configuration. There is a need in the art for an improved protocol that can configure or reconfigure the network pathways automatically and/or reduce the overhead resulting from network management.

SUMMARY OF THE INVENTION

Disclosed herein are methods and systems for configuring nodes in a redundant network configuration. A master node is identified from a plurality of nodes in the network by sending a configuration packet to each node. The configuration packet comprising an identification number representing the node in the network from which the configuration packet originates, where each node in the network has a unique identification number. At each node in the network, the identification number in the configuration packet is compared to an identification number for that node. In one embodiment, the node whose identification number is greater than the identification number in the configuration packet is designated the master node. A virtual break is created in the network at the location of the master node to prevent a packet from returning to the node from which it originates.

BRIEF DESCRIPTION OF THE DRAWINGS

The invention will be more fully understood from the following detailed description taken in conjunction with the accompanying drawings in which:

FIG. 7 illustrates a flowchart of the initialization of a node in the network when the node is powered on;

DETAILED DESCRIPTION

Disclosed herein are systems and methods for preventing undesirable loops in a network having redundant paths between nodes. In preferred embodiments, the systems and methods operate to create virtual breaks in network loops, and thereby prevent redundant packet traffic, without the network overhead or management intervention required by previous methods.

Systems and methods disclosed herein can operate by identifying master nodes. As used herein, a source node is a node in the network from which a packet originates. A host node is a node in the network that receives packets from a source node. Each node in the network can be both a source node and a host node. A master node can be identified by having each node in the network send a configuration packet throughout the network. The configuration packet includes an identifier representing the node in the network from which the configuration packet originates—with each node in the network having a unique identifier. Each node in the network can then compare the identifier in configuration packets it receives to its own identifier. Each node can consider itself the master node until such time as it receives a packet having a higher value identifier than its own. Ultimately, each loop will have only one master node, and this master node can create a virtual break in order to block redundant pathways in the network.

Figure 1:
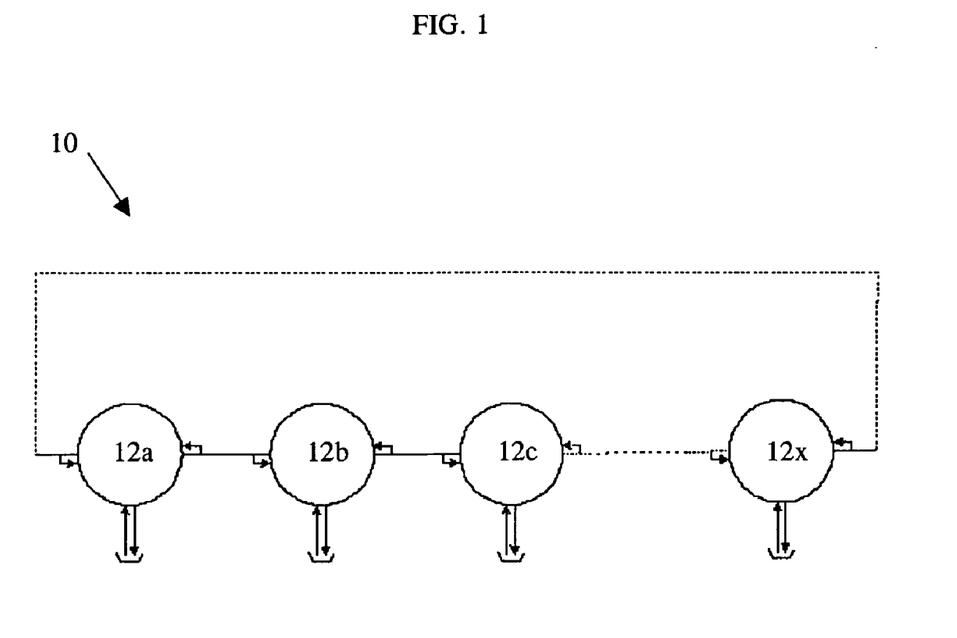
FIG. 1 illustrates an exemplary embodiment of a redundant network configuration to which the invention can be applied.

FIG. 1 illustrates an exemplary embodiment of a redundant network configuration 10 in which the systems and methods of the invention can be deployed. The network 10 comprises a plurality a nodes 12a-12x that are connected in a ring configuration, where each node is connected to two other nodes in the network, forming a ring of nodes 12a-12x. In an exemplary embodiment, each node comprises an Ethernet switch, and the connections between the nodes are full-duplex single fiber connections. Each switch includes two fiber ports; fiber port-0 and fiber port-1. The packet header of the packets received at either fiber port can be forwarded to the other fiber port using a packet header forwarding bus within the switch. While this exemplary embodiment, and much of the discussion that follows, will be used to describe the operation and features of the invention, a person of ordinary skill in the art will recognize that the systems and methods described herein can be deployed in other network topologies, in nodes other than Ethernet switches, and using communications other than full-duplex fiber connections.

The ring network configuration 10 illustrated in FIG. 1 provides two direct paths between any source and destination node 12—clockwise and counter-clockwise. The path redundancy in this configuration can provide a backup path in the event that any node or communication line should fail. However, only one pathway can be active at any one time in order for the network to perform in an optimal manner.

Figure 2:
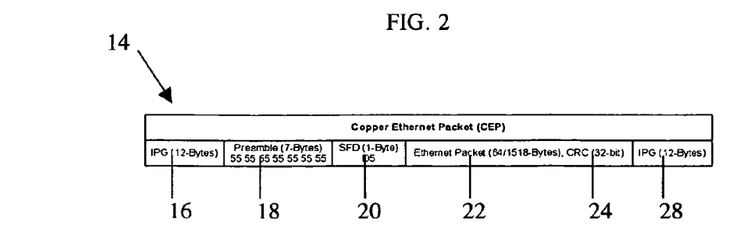
FIG. 2 illustrates an exemplary copper Ethernet packet for use with the network of FIG. 1.

FIG. 2 is an exemplary standard Ethernet packet 14, also referred to herein as a Copper Ethernet Packet. Ethernet packet 14 can be sent around the network of the invention to pass information between the various nodes. Ethernet packet 14 includes two 12-byte interpacket gaps (IPG) 16 and 28 before and after the rest of the packet is transmitted. There is a 7-byte preamble 18 and a 1-byte start frame delimiter (SFD) 20. Additionally, Ethernet packet 14 contains the packet information 24 and a 32-bit CRC 26.

Figure 3:
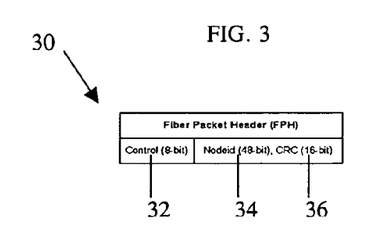
FIG. 3 illustrates an exemplary fiber packet header of the invention.

The operation of the network may be enhanced by providing additional information to the Ethernet packet 14, such as an exemplary packet header 30 shown in FIG. 3, and also referred to herein as a Fiber Packet Header. Fiber packet header 30 comprises a control portion 32 and a Node ID 34 with its corresponding 16-bit CRC 36. The CRC bits contain error-checking information to allow the node receiving the packet to determine if the packet is free of errors. The control portion 32 provides information that can be read by each node in the network to be used in the process of configuring the nodes. The Node ID 34 is preferably a unique identification number assigned to each node at manufacture to allow each node to be uniquely identified in the network.

Figure 4:
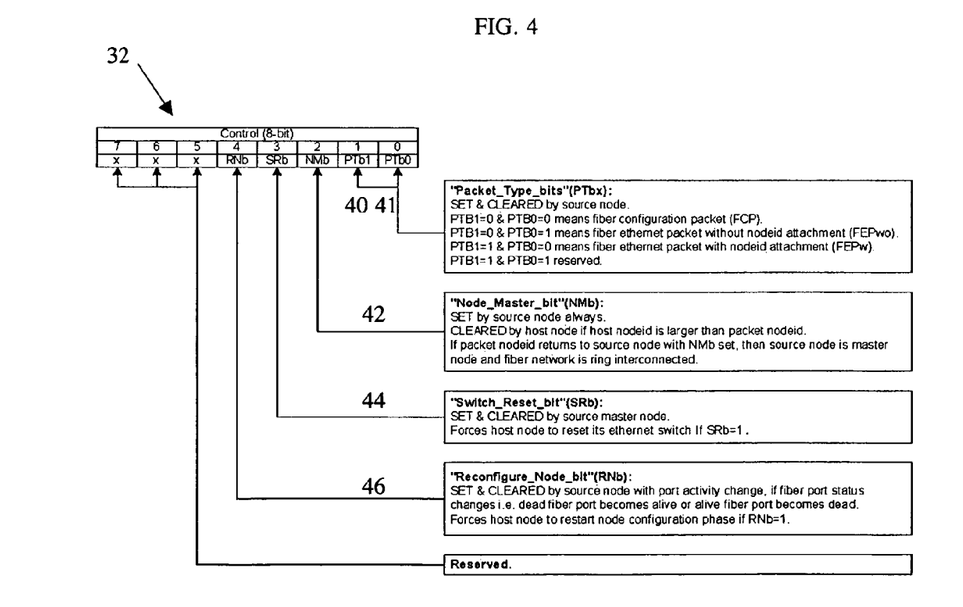
FIG. 4 illustrates an exemplary control portion of a fiber packet header according to FIG. 3.

FIG. 4 shows the 8-bit control portion 32 of the fiber packet header 30 that may be added to Ethernet packet 14. The control bits are used, along with the Node ID, to determine which node in the network is the master node in order to create the virtual break in the network. The control portion can have a variety of configurations and can include the specific information discussed below, or other and/or additional information. In an exemplary embodiment, an 8-bit control portion can be utilized for configuration of the nodes in the network to determine the master node.

A node master bit 42 is set by the source node from which the packet originates. The node master bit is used to determine which node will be the master node. A host node that receives the packet will compares its own Node ID to the Node ID in the packet, which is the identification information of the source node. If the Node ID of the host is larger that the Node ID in the packet, the host node will clear node master bit 42. Clearing the node master bit indicates to the source node that it is not the master node.

A switch reset bit 44 is used to force a host node to reset. This control bit is set and cleared by the source node after that source node has determined that it is the master node. When a node receives a control portion with the switch reset bit 44 set to one, it reconfigures by clearing a chip within the switch containing MAC address tables. The information cached in these tables is used by the switch when that switch is sending packets using a forwarding algorithm to determine the most efficient route in the network to send the packet to its destination. When, during configuration, a new master node is identified, there is now a break in the network at a new location, meaning that the routes in the network through which a packet can travel are changed. The information cached in the MAC tables must be cleared using the switch reset bit 44 to be recached with the changing network information.

A reconfigure node bit 46 is used to force a host node into a reconfiguration phase. This bit is set and cleared by the source node, and is set or cleared based on the port activity at the ports of the source node. Reconfiguration of the network is necessary when the network powers on the node initialize, and when a problem occurs in the network, such as when a node goes off-line. When such a problem occurs, the network must reconfigure to determine the master node.

Packet type bits are used to designate the type of packet being sent through the network. The packet type bits can utilize any number of bits to designate the packet type depending on the number of packet types that are capable of being transmitted by nodes in the network. In one embodiment, two packet type bits 40 and 41 are used to designate the type of packet. The packet types include a fiber configuration packet designated when bits 40 and 41 are set to zero, a fiber Ethernet packet with a Node ID designated when bit 40 is set to 1 and bit 41 is set to zero, and a fiber Ethernet packet without a Node ID designated when bit 40 is set to zero and bit 41 is set to 1. These packet types are shown in FIGS. 5A-5C.

Figure 5A:
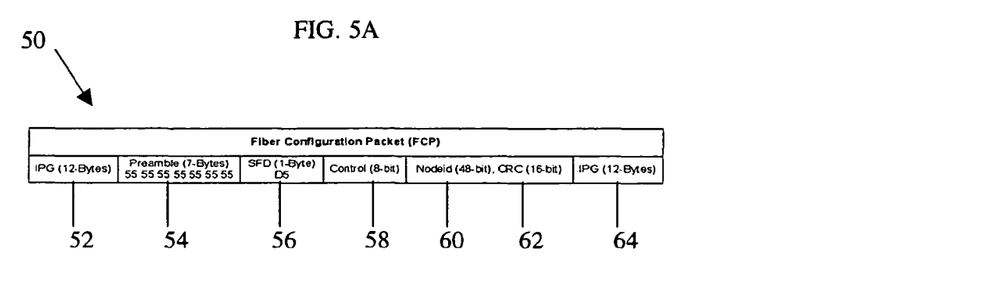
FIG. 5A illustrates an exemplary fiber configuration packet of the invention.
Figure 5B:
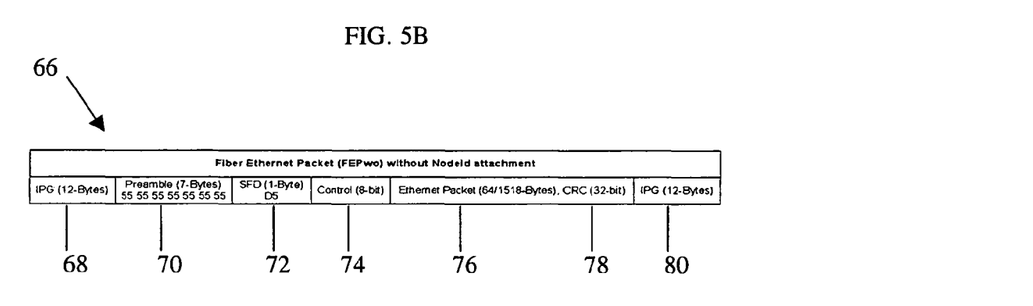
FIG. 5B illustrates an exemplary fiber Ethernet packet of the invention without a Node ID.
Figure 5C:
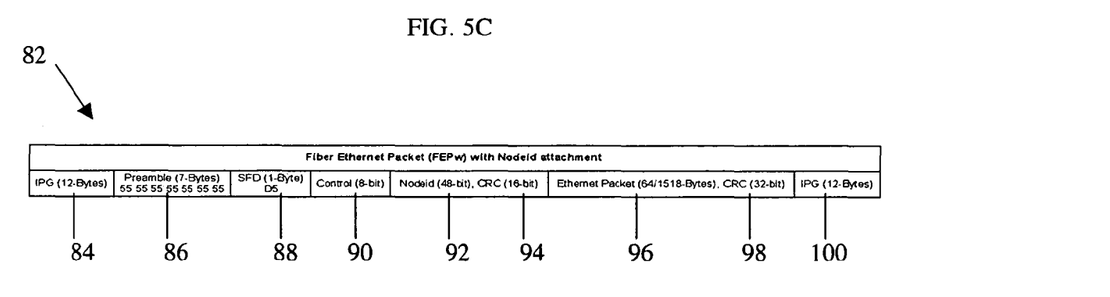
FIG. 5C illustrates an exemplary fiber Ethernet packet of the invention with a Node ID.

FIGS. 5A-5C are exemplary packets that can be sent through network 10. The packets shown in FIGS. 5A-5C all contain the control portion shown in FIG. 4. FIG. 5A shows a fiber configuration packet 50. This type of configuration packet can be used to configure or reconfigure the network without carrying further data. The packet includes two 12-byte interpacket gaps (IPG) 52 and 64 before and after the rest of the packet is transmitted. There is a 7-byte preamble 54 and a 1-byte start frame delimiter (SFD) 56. The control 58 comprises 8 bits. There is a 16-bit CRC 62 and a 48-bit Node ID 60. Node ID 60 provides node identification information for each node in the network. Each node has its own Node ID 60 that is used in the process of determining the master node in the network to prevent a packet from recirculating around the ring back to the source node from which it originated.

FIG. 5B shows a fiber Ethernet packet 66 that carries data, but does not contain a Node ID. The fiber Ethernet packet 66 comprises a two 12-byte IPGs 68 and 80, a 7-byte preamble 70, a 1-byte SDF 72, an 8-bit control 74, and an Ethernet packet 76 with a 32-bit CRC 78. Without a Node ID, this packet type cannot be used to determine the master node in the network. Fiber Ethernet packet 66 can, however, carry control information through the network in addition to its payload data.

FIG. 5C shows a fiber Ethernet packet 82 with a Node ID. The fiber Ethernet packet 82 comprises a two 12-byte IPGs 84 and 100, a 7-byte preamble 86, a 1-byte SDF 88, an 8-bit control 90, a 48-bit Node ID 92 with a 16-bit CRC 94, and Ethernet packet 96 with a 32-bit CRC 98. Fiber Ethernet packet 82 contains both payload data in Ethernet packet 96 and a Node ID 92 for determining the master node to enable data to be passed around the network while configuration is taking place.

Figure 6A:
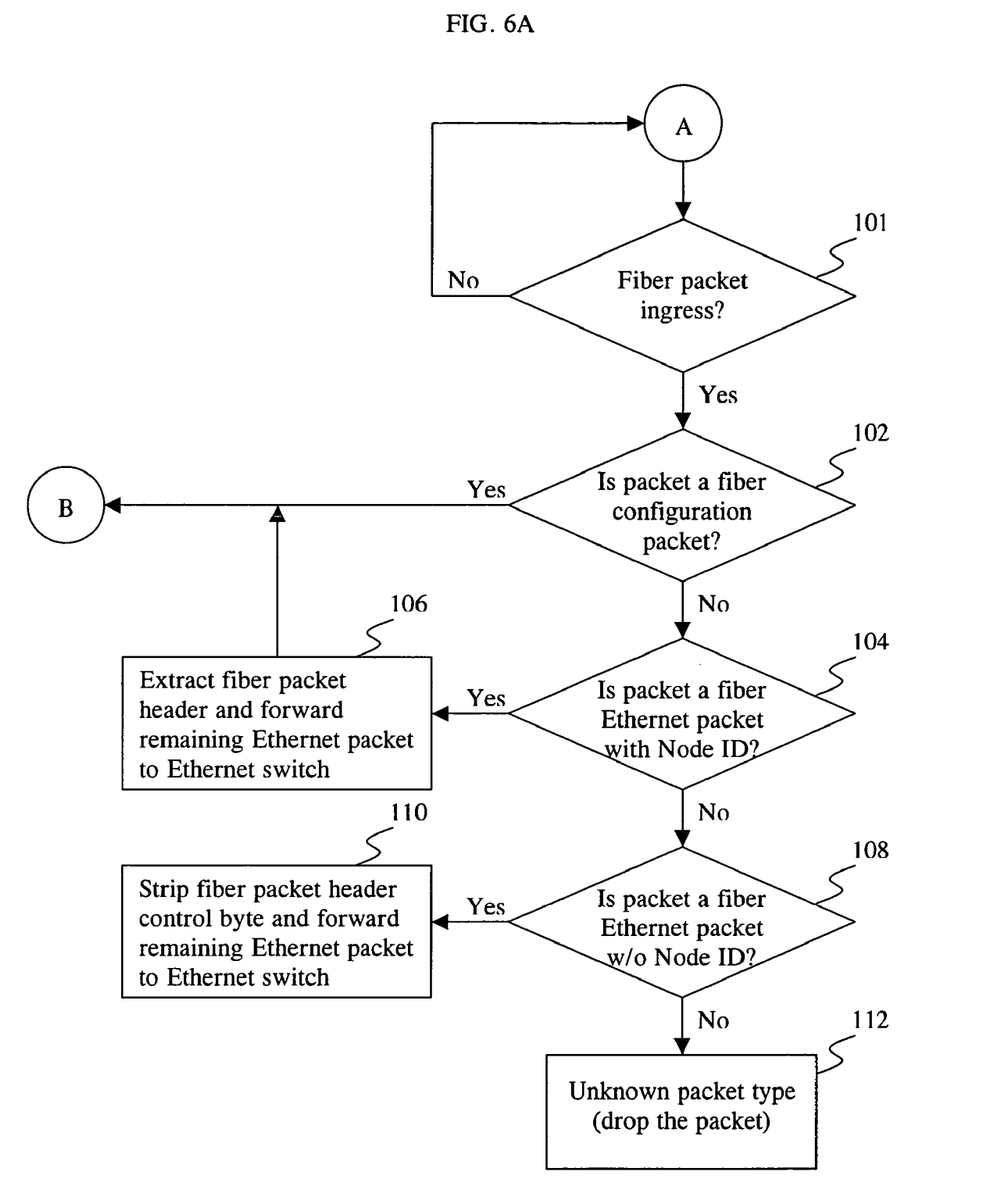
FIG. 6A illustrates a flowchart of a process of the invention by which a node in the network determines the type of packet that it has received.
Figure 6B:
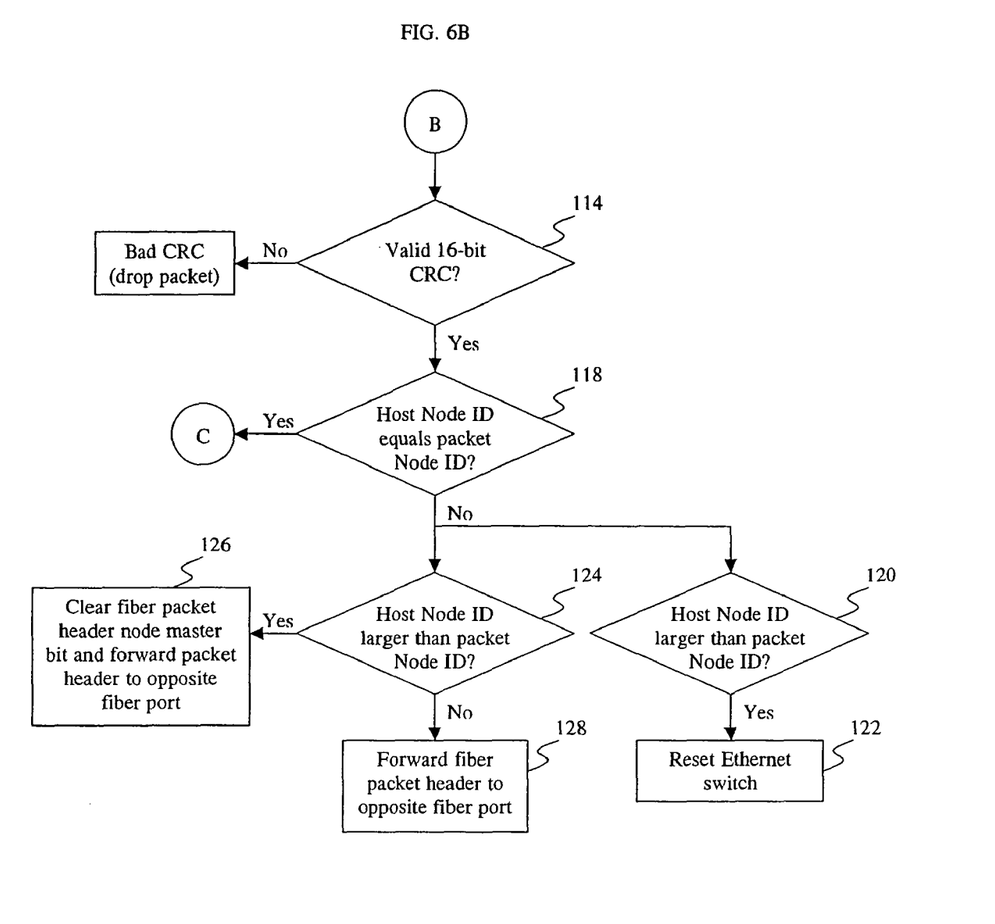
FIG. 6B illustrates a flowchart of a process of the invention by which a node compares its Node ID to the Node ID of a configuration packet that is received at the node.
Figure 6C:
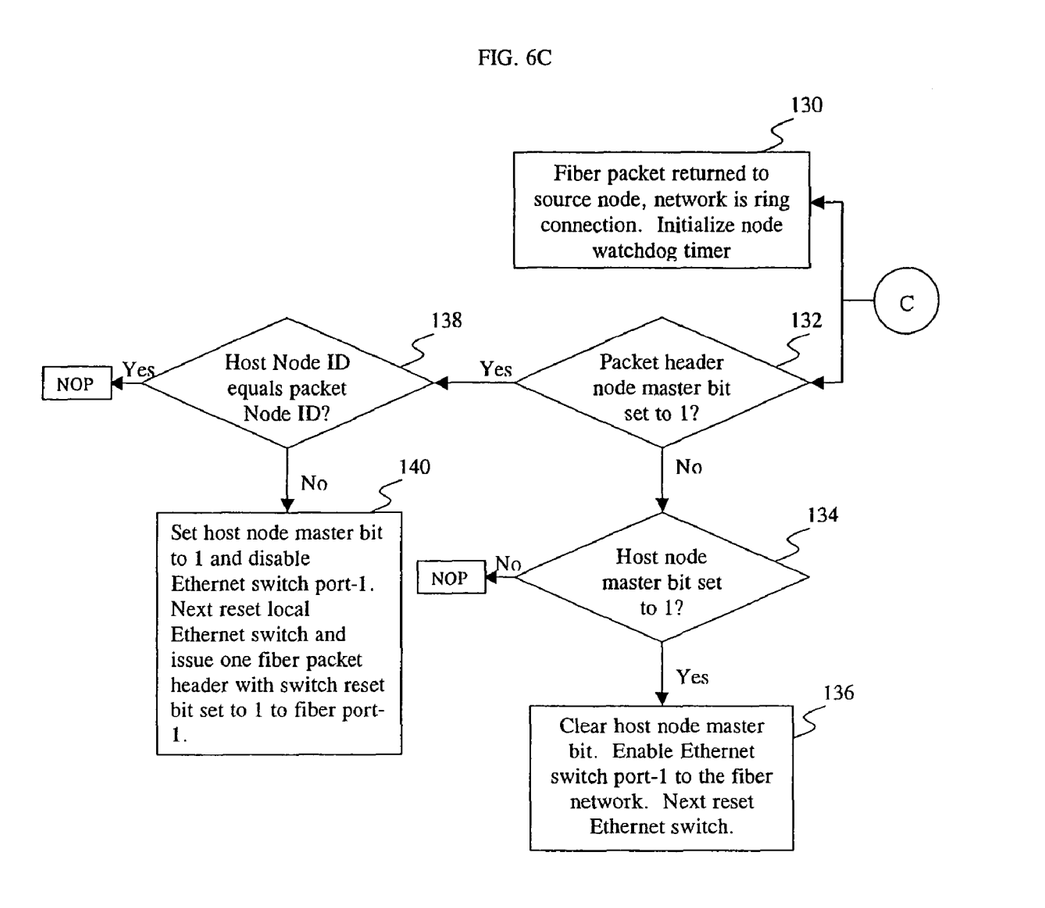
FIG. 6C illustrates a flowchart of a process of the invention by which the source node determines if the source node is the master node.

Having provided description of the data structures used in an exemplary embodiment of the invention, the following describes how to use these structures to determine the master node and create the virtual break in the network. FIG. 6A-6C is a flowchart of the method of determining the master node in the network. In FIG. 6A, a host node determines if it has received a packet in step 101 by checking its network ports, denominated here as fiber port-1 and fiber port-0. If a packet has been received, the host node determines the type of packet in steps 102, 104, and 108 by checking the packet type bits in the control segment of the packet. If the host node determines it is a fiber control packet in step 102, the process continues in FIG. 6B. If the packet is not a fiber configuration packet, the process continues to step 104, where the host node determines if the packet is a fiber Ethernet packet. If the host node determines the packet is a fiber Ethernet packet with a Node ID in step 104, the fiber packet header, which contains the Node ID, is extracted, while the rest of the packet is forwarded to an Ethernet switch within the host node in step 106. The process then continues to FIG. 6B. If the packet is not a fiber Ethernet packet with a Node ID, the host node determines if the packet is a fiber Ethernet packet without a Node ID in step 108. If it is a fiber Ethernet packet without a Node ID, the fiber packet header is stripped from the packet and the remaining portion of the packet is forwarded to an Ethernet switch within the host node in step 110. If the packet is not a fiber Ethernet packet without a Node ID, then the packet type is determined to be unknown and the packet is dropped in step 112.

FIG. 6B is a flowchart of the process by which a node compares its Node ID to the Node ID of a configuration packet that it receives. After the host node determines that the packet is a fiber configuration packet in step 102 of FIG. 6A, or a fiber Ethernet packet with a Node ID in step 104 of FIG. 6A, the host node checks the 16-bit CRC in step 114. If it is not valid, the packet is dropped in step 116.

If the 16-bit CRC is valid, the host node determines if the host node Node ID is equal to the Node ID in the received packet in step 118. If the host node's Node ID is not equal to the packet's Node ID, the host node checks the switch reset bit in the control portion of the packet header in step 120. If the switch reset bit is set, the host node resets its Ethernet switch in step 122.

Additionally, the host node determines if its Node ID is larger than the Node ID of the packet in step 124. If it is larger than the packet's Node ID, then the node master bit is cleared, and the packet header is forwarded to the opposite fiber port through the packet header forwarding bus (step 126). By clearing the node master node, the source node is notified that it is not the master node when the packet is returned to the source node. If the host node's Node ID is not larger, then the packet header is forwarded to the opposite fiber port without clearing the node master bit (step 128). If, after being circulated to all the nodes in the network, the node master bit returns to the source node without having been cleared, the source node is the master node in the network.

If the host node's Node ID is equal to the packet Node ID (step 118), the process continues to FIG. 6C. When the host node's Node ID equals the packet Node ID, the packet has returned to the source node, meaning the host node is actually the source node. The source node's watchdog time is initialized in step 130.

The source node checks the node master bit in step 132. If the node master bit is cleared, the source node is not the master node. If it is not the master node, the source node checks the host node master bit in step 134. The host node bit is an internal control bit within each node that is set by each node during initialization of the network. If the only node in the network that will set its host master bit to one is that master node. Thus, if the host node is not the current master node, but its host master bit is set, this node was previously the master node but is now not the master node. When this change occurs to the status as master of the host node, the source node clears the host master bit and resets itself in step 136. As discussed above, a node will reset itself for the same reasons as new master node will send out a switch reset bit to reset the other nodes in the network; the MAC address tables in the node must be cleared because there is a new master node in the network and the location of the virtual break has changed.

If, in step 134, the host node master bit it not set, then the node takes no action. Since the node was not previously or is now currently the master node in the network, the host node master bit is already cleared, and the switch does not need to be reset at this time.

If the node master bit is set, the source node is the master node. The source node must check the host master node bit in step 138 is determine if this node was the previous master node, meaning the virtual break in the network will not change positions, or if this node is a new master node. If the host master bit is set, no action is taken. The virtual break will remain in the same location so that MAC address tables in all the nodes in the network contain current information and do not need to be cleared.

If the host node master bit is not set, then the source node is a new master node, and the node must set its host node master bit, identifying itself as the new master node. Additionally, a virtual break is created at one of the fiber ports if this node. In one exemplary embodiment, the virtual break is created at fiber port-1. The node resets itself, as well as sends out a fiber packet header with the switch reset bit set to 1 to cause all the nodes in the network to reset themselves.

Figure 7:
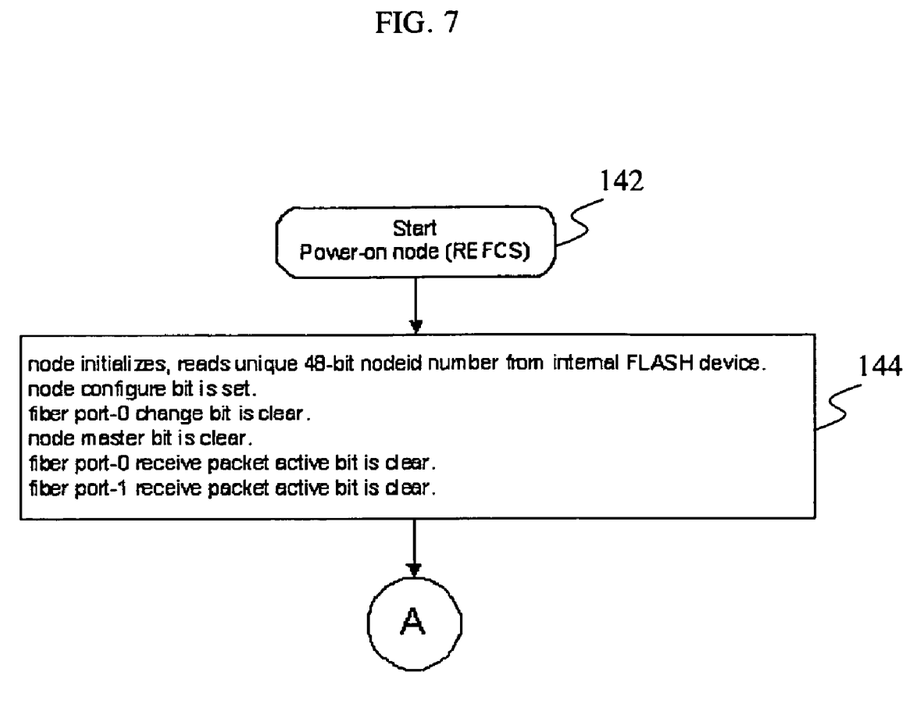

FIG. 7 is a flowchart of the initialization of a node in the network when the node is powered on. After a node is powered on in step 142, a number of initialization steps occur in the node in step 144, including reading its Node ID from an internal memory to be used in the configuration process when comparing the Node ID to the Node ID in a received packet.

Additionally, a number of internal control bit are initialized. The node configure bit is set, while the fiber port-0 change bit and the host node master bit are cleared. The fiber port-0 receive packet bit and the fiber port-1 receive packet bit are cleared.

In addition to the configuration of the network that occurs when the network nodes are initialized, there can be instances during operation of the network when a reconfiguration of the nodes of the network is necessary. In an exemplary embodiment, the nodes of the network are reconfigured when a network problem is detected through the use of a watchdog timer in each node of the network.

A watchdog timer can be utilized in each node to monitor activity on the fiber ports of a node to force a reconfiguration of the network in the event of a problem detected in the network. An absence of packet traffic on a fiber port can be detected by the watchdog timer, signaling that the network needs to be reconfigured. The watchdog timer signals the fiber port to transmit a preamble of a fiber Ethernet packet as a "fiber port alive" signal to the fiber ports. The fiber port alive signal maintains fiber port activity in the event that there is not packet traffic.

Figure 8:
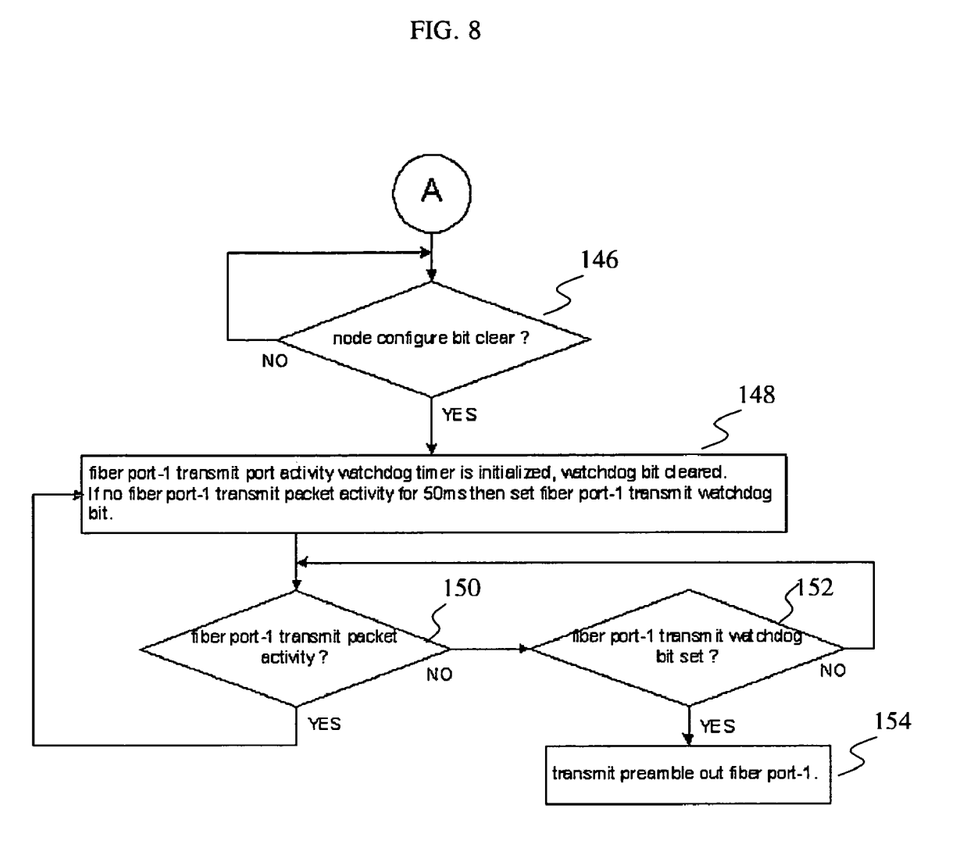
FIG. 8 illustrates a flowchart of the watchdog process in a fiber port of a node in the network.

FIG. 8 shows a method of maintaining fiber port activity in the absence of packet traffic. In step 146, the node configure bit is checked, to determine if the node should be configured. If the node configure bit is cleared, the watchdog timer is initialized in step 148 to detect an absence of packet traffic at the node's fiber ports, indicating that node reconfiguration is necessary. The watchdog time determines the amount of time during which there is no packet activity on the fiber port. If there is packet activity detected before 50 ms of time has passed, this indicates that the network is working properly and that reconfiguration is not needed, so the watchdog timer is reset. If there is no activity after the 50 ms has passed, (step 150) and the watchdog bit is set (step 152), the fiber port transmits a preamble of a packet to keep the fiber port alive. This method applies to both fiber port-1 and fiber port-0 of each node in the network.

Figure 9:
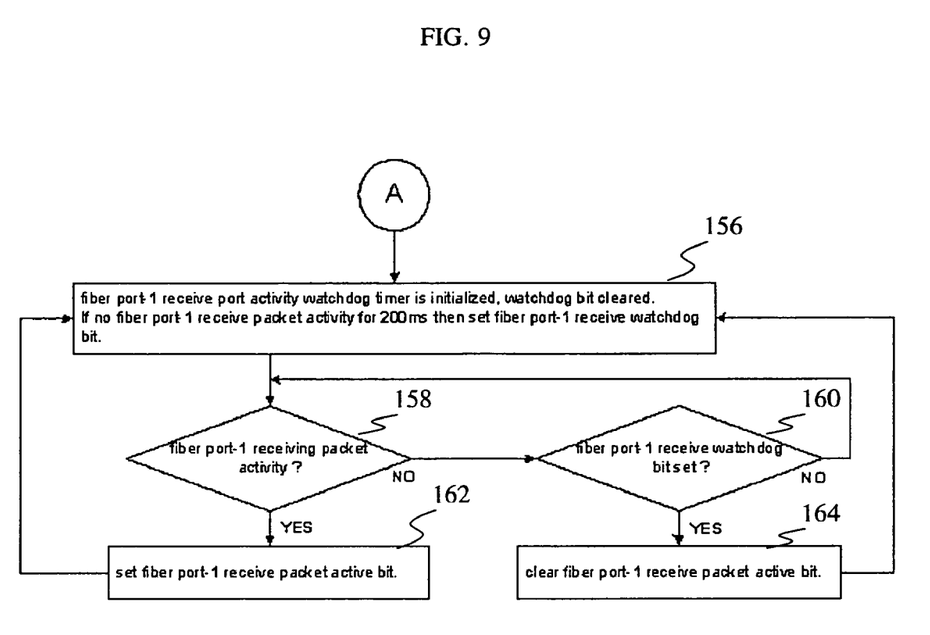
FIG. 9 illustrates a flowchart of a process of the invention of determining connectivity a in fiber port of a node in the network.

FIG. 9 is a flowchart of the process of determining connectivity in a fiber port of a node in the network. At power-on, the fiber port watchdog timer is initialized, and the watchdog bit is cleared in step 156. The watchdog bit is set when there is no activity on a fiber port for 200 ms in step 158. If the fiber port then becomes active and receives a packet, the fiber port receive packet bit is set, and the watchdog bit is cleared in step 162. If no packets have been received on the fiber port, the fiber port checks the watchdog bit in step 160. If the bit is set, the fiber port receive packet bit is cleared in step 164. This method applies to both fiber port-1 and fiber port-0 of each node in the network.

Figure 10:
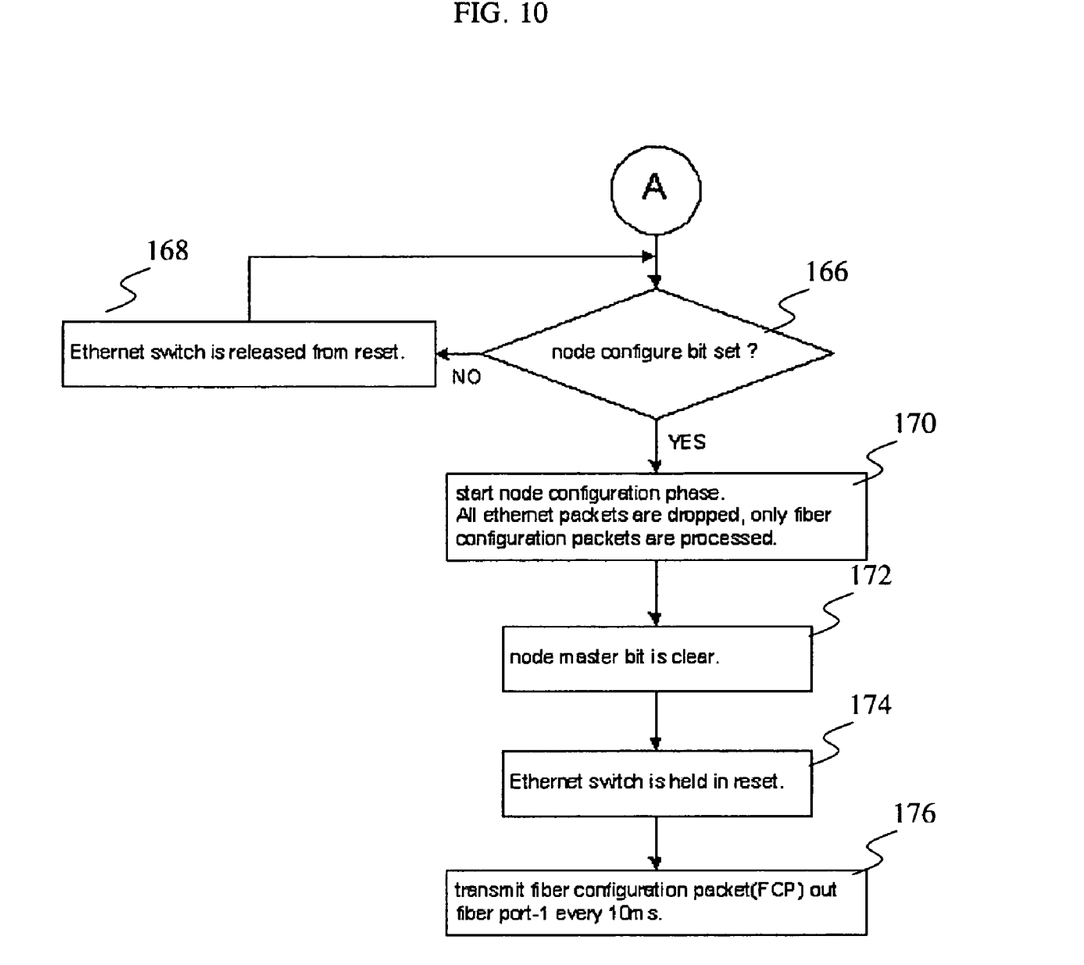
FIG. 10 illustrates a flowchart of a process of the invention of determining when to reset a node in the network.

FIG. 10 is a flowchart of the process of determining when to reset a node in the network, and when to send a fiber configuration packet to reconfigure the network. At power-on, the node configure bit is checked. If it is not set, the Ethernet switch is not reset. If the node configure bit is set, the node is reconfigured, during which time all Ethernet packets are dropped, while fiber configuration packets continue to be processed. The node master bit is cleared, and the Ethernet switch is reset. Fiber configuration packets are transmitted out of the node every 10 ms to reconfigure the network.

In another exemplary embodiment, the network can instead be constantly reconfigured as an alternative to the use of the watchdog timer for signaling when the network needs reconfiguration. Unlike the use of the watchdog timer, which only reconfigures the network when a network problem is detected, constantly configuring the network ensures the network is configured properly, regardless of the state of the network.

Figure 11:
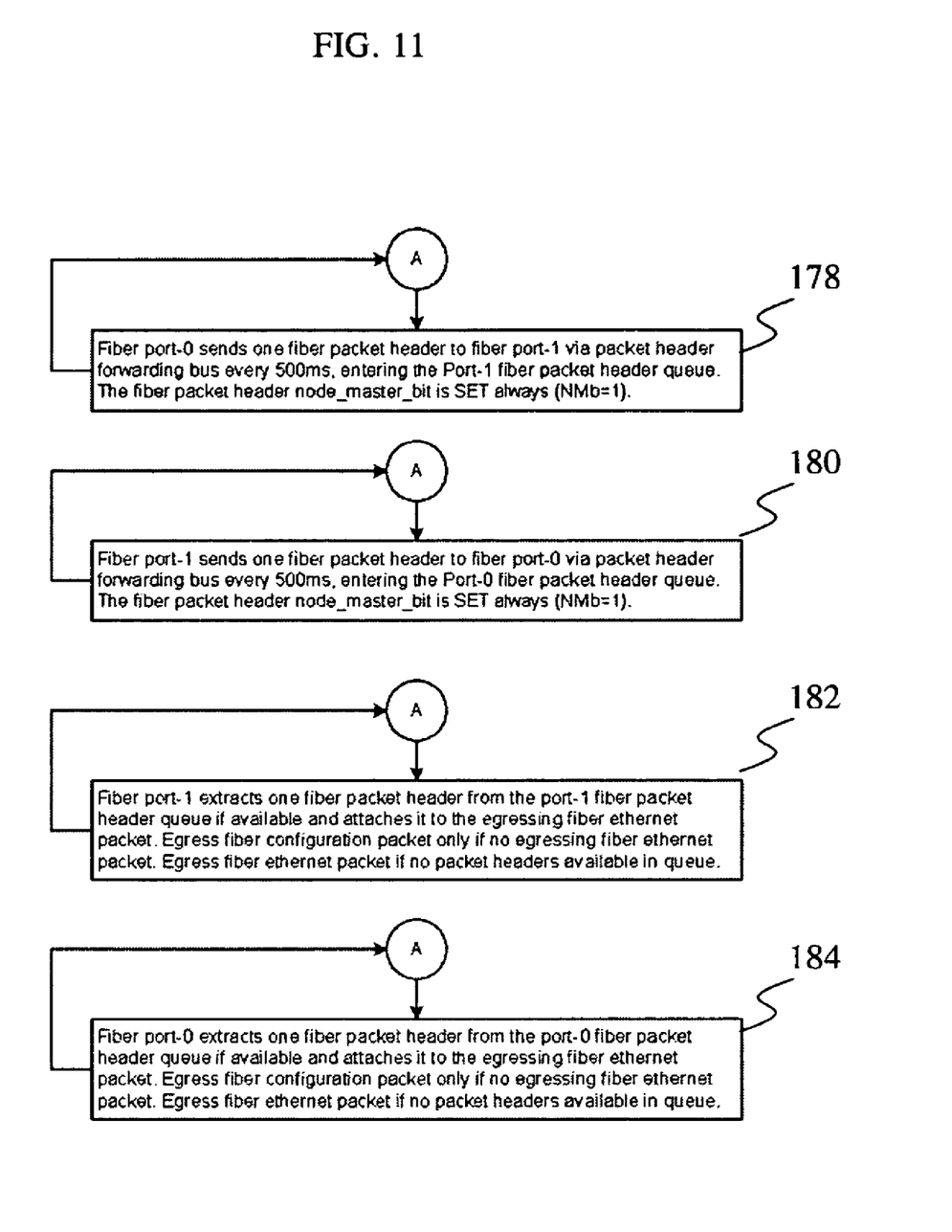
FIG. 11 illustrates a flowchart of a process of the invention of constantly configuring the node in the network.

FIG. 11 is a flowchart of the process of constantly configuring a node in the network. A fiber packet header is sent between the fiber ports in the node every 500 ms using a packet header forwarding bus within the node. In the control portion of the fiber packet header, the node master bit is always set during this constant configuring (steps 178 and 180). These fiber packet headers are put into the queue of packets being transmitted from the node. When a fiber Ethernet packet is being sent from the node, the fiber port attaches one of the fiber packet headers if one is available. If there are no available fiber Ethernet packets to attach to, just a fiber configuration packet alone is transmitted from the node to facilitate constant configuring in the network (steps 182 and 184).

Figure 12:
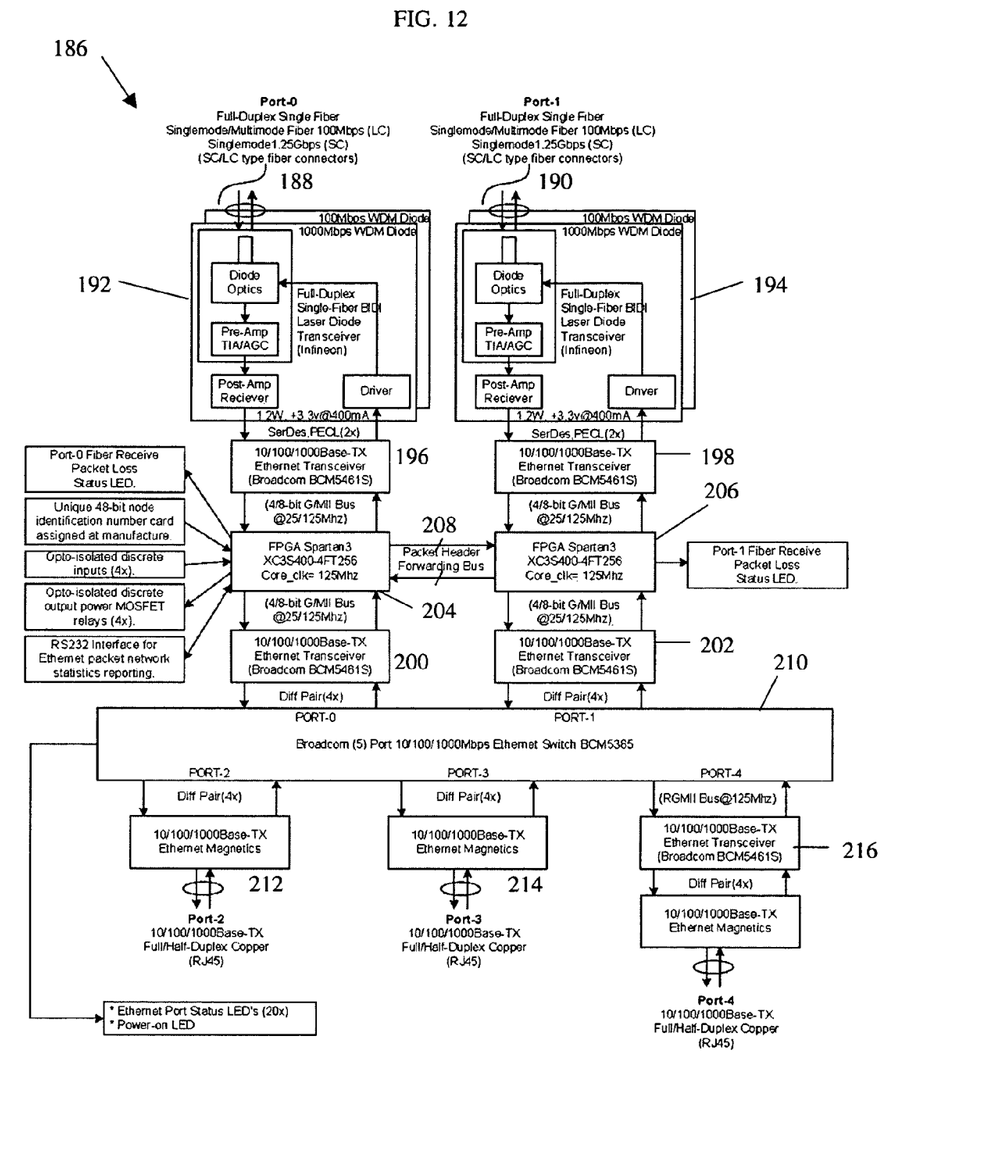
FIG. 12 illustrates an exemplary embodiment of a node in the network.

FIG. 12 is an exemplary embodiment of a node in the network. An Ethernet switch 186 is shown for carrying out the principles of the invention. The Ethernet switch 186 includes a fiber port-0 188 and a fiber port-1 190, both of which can be full duplex single fiber ports, such as the Full-Duplex Single Fiber Singlemode/Multimode Fiber available from Infineon Technologies AG of Munich Germany. All of the components of the Ethernet switch 186 can be standard chips available from a variety of sources. For example, the wavelength division multiplexing diodes 192, 194, which are coupled to the fiber ports 188, 190, are available from Infineon. Ethernet transceivers 196, 198, 200, 202 are available from Broadcom Corporation of Irvine Calif. (such as the Broadcom BCM5461S chips shown in FIG. 12). FPGA 204, 206 store firmware to process the steps for carrying out the invention, and can communicate with each other through a packet header forwarding bus 208. Ethernet transceivers 200, 202 communicate with an Ethernet switch 210, available from Broadcom (such as the Broadcom BCM5385), which also communications with Ethernet Magnetics 212, 214 and Ethernet transceiver 216.

A person of ordinary skill in the art will recognize that the principals of the invention can be carried out using systems that vary from that disclosed in FIG. 12. For example, the node need not be an Ethernet switch but could be another digital routing element as is known in the art, including a computer programmed to act as such a routing element. The network connections need not be full duplex single fibers but be copper or other than full duplex connections. Still further, an FPGA storing firmware for executing the described methods is illustrated in FIG. 12 as a processor for implementing the invention, but the invention could be carried out, for example, in software with a general purpose processor, or could be implemented in hardware such as by use of an ASIC. Still further, the invention can include a network of nodes operating as described.

A person of ordinary skill in the art will appreciate further features and advantages of the invention based on the above-described embodiments. For example, specific features from any of the embodiments described may be incorporated into systems or methods of the invention in a variety of combinations, as well as features referred to in the claims below which may be implemented by means described herein. Accordingly, the invention is not to be limited by what has been particularly shown and described, except as indicated by the appended claims or those ultimately provided. Any publications and references cited herein are expressly incorporated herein by reference in their entity.

The invention claimed is:

1. A network node for operation in a redundant network having a plurality of nodes comprising:
an Ethernet switch having first and second network ports;
first and second processors in communication with the Ethernet switch, the first processor connected to the first network port and the second processor connected to the second network port, the processors being configured to determine whether the network node is a master node from among the plurality of nodes in the network, where determining includes:
sending a configuration packet to each node in the network, the configuration packet comprising an identification number representing the node in the network from which the configuration packet originates, where each node in the network has a unique identification number, and;
comparing the identification number in configuration packets received by the node to the identification number for the node, where the master node is designated based on the comparison of the value of the identification numbers; and
a means for creating a virtual break in the network at one of the network connections if the node determines that it is the master node;
wherein each of the first and second processors implements a watchdog timer by executing instructions to:
(a) initialize the watchdog timer and clear a watchdog timer bit;
(b) monitor the network port for activity within a predetermined period of time, if there is no activity on the network port within the predetermined period of time, set the watchdog bit;
(c) continue to monitor the network port for activity thereafter, and
(i) if the port becomes active and receives a packet, set a receive packet bit and clear the watchdog bit, or
(ii) if no packets are received on the network port, check the watchdog bit and if the watchdog bit is set, clear the receive packet bit.

2. A redundant network system comprising a plurality of the network nodes of claim 1 in digital communication.

3. The network node of claim 1, wherein the first and second processors are general purpose processors having software for determining whether the network node is a master node from among the plurality of nodes in the network.

4. The network node of claim 1, wherein the first and second processors are application specific integrated circuits having circuitry for determining whether the network node is a master node from among the plurality of nodes in the network.

5. The network node of claim 1, wherein the first and second processors are field programmable gate arrays having firmware for determining whether the network node is a master node from among the plurality of nodes in the network.

6. The network node of claim 1, wherein the node having the highest value identification number is designated as the master node.

7. The network node of claim 1, wherein the configuration packet comprises a header having a node identification number.

8. The network node of claim 7, wherein the header includes a control portion.

9. The network node of claim 8, wherein the control portion includes 8 bits.

10. The network node of claim 8, wherein the control portion includes a node master bit, the node master bit being set to a master node value by a source node, and being cleared by any host node that would be the master node as a result of the comparison of identification number between the source node and the host node.

11. The network node of claim 10, wherein when the host node receives a configuration packet having the host node's identification number with the master node value cleared, the host node ensures that it does not provide a virtual break in the network.

12. The network node of claim 10, wherein when the host node receives a configuration packet having the host node's identification number with the master node value set, the host node acts as a master node and provides a virtual break in the network.

13. The network node of claim 8, wherein the control portion includes a switch reset bit, and when a new master node is designated, the switch reset bit is set to indicate to nodes receiving the configuration packet that the nodes should be reset.

14. The network node of claim 8, wherein the control portion includes a reconfigure node bit that is set to indicate that the network is to be reconfigured and a new master node designated.

15. The network node of claim 14, wherein the reconfigure node bit is set to indicate that the network is to be reconfigured upon start-up of a node.

16. The network node of claim 14, wherein the reconfigure node bit is set to indicate that the network is to be reconfigured upon an indication from a watchdog timer system.

17. The network node of claim 14, wherein all packets are configuration packets and the reconfigure node bit is set to indicate that the network is to be reconfigured upon determining that a new master node is designated.

18. The network node of claim 1, wherein the first processor is connected only to the first network port and the second processor is connected only to the second network port.

19. The network node of claim 18, wherein the first and second processors are connected by a forwarding bus and the forwarding bus transfers data for another network node from the first network port to the second network port.

* * * * *